US 6,862,030 B1

(12) United States Patent
Bachmann

(10) Patent No.: US 6,862,030 B1
(45) Date of Patent: Mar. 1, 2005

(54) METHOD FOR SHOWING THE EXECUTION TRAIL OF OBJECTS IN A GRAPHICAL PROGRAMMING LANGUAGE

(75) Inventor: James T. Bachmann, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 940 days.

(21) Appl. No.: 09/033,901

(22) Filed: Feb. 28, 1998

(51) Int. Cl.[7] ................................. G09G 5/00
(52) U.S. Cl. .................. 345/772; 345/810; 345/821; 717/127
(58) Field of Search ................... 345/772, 810, 345/821–825, 835–837, 846, 700, 853–855, 966–967, 976–977, 348, 349, 334, 335; 717/127–129, 131

(56) References Cited

U.S. PATENT DOCUMENTS

| 5,005,119 | A | * | 4/1991 | Rumbaugh et al. | 364/191 |
| 5,392,207 | A | * | 2/1995 | Wilson et al. | 345/349 |
| 5,475,843 | A | * | 12/1995 | Halviatti et al. | 717/124 |
| 5,821,934 | A | * | 10/1998 | Kodosky et al. | 345/348 |
| 5,867,163 | A | * | 2/1999 | Kurtenbach | 345/354 |
| 6,239,800 | B1 | * | 5/2001 | Mayhew et al. | 345/764 |
| 6,286,137 | B1 | * | 9/2001 | Bleizeffer et al. | 717/127 |

* cited by examiner

*Primary Examiner*—Sy D. Luu

(57) ABSTRACT

In an iconic programming computer system, the execution trail of objects is shown. Upon initiation by a user, the icons that have executed are highlighted so that the user, while debugging a program, can trace the path that the program has taken and identify which icons have executed.

10 Claims, 3 Drawing Sheets

METHOD FOR SHOWING THE EXECUTION TRAIL OF OBJECTS IN A GRAPHICAL PROGRAMMING LANGUAGE

FIELD OF THE INVENTION

The present invention relates generally to computer systems and more particularly to a method for showing the execution trail of objects in a graphical programming language.

BACKGROUND OF THE INVENTION

Graphical programming languages, like Hewlett-Packard's VEE, are iconic programming systems. Such a system is a "programming-less" environment where programming is performed by employing objects, or icons (i.e., graphical images of functions), together with connecting lines, to form a directed graph and create an iconic network which is representative of a software program. The iconic programming system may be used in a test and measurement system, where several different electronic instruments are connected to test a system or a device. Programming such a system requires instructions to cause the various instruments to perform desired functions in order to operate as a system. When an iconic programming system is used, each instrument will be represented by a graphical icon, and the connections between the instruments are represented by lines between the icons. Programming functions, such as IF-THEN-ELSE statements and FOR loops, can also be represented by icons. By combining programming icons with instrument icons, a user can create an iconic network related to the operation of the instruments.

Such iconic networks are often large and/or complicated. Debugging these networks is tedious and fraught with pitfalls. Often the user cannot be sure which icons have already executed and which paths the program took. There is a need in the art then for a system that will provide a way for a programmer in an iconic programming system to trace the path a program has taken and to identify which icons have executed while debugging the program.

Various features and components of an iconic programming system are disclosed in U.S. Pat. No. 5,325,481 for METHOD FOR CREATING DYNAMIC USER PANELS IN AN ICONIC PROGRAMMING SYSTEM of Hunt and U.S. Pat. No. 5,261,043 for PROCESSING METHOD FOR AN ICONIC PROGRAMMING SYSTEM of Beethe, each of which is hereby specifically incorporated by reference for all that is disclosed therein.

SUMMARY OF THE INVENTION

The present invention provides a method for showing the execution trail of objects in a graphical programming language. Upon initiation by the user, the method highlights objects that have executed so that, while debugging a program, the user can trace the path a program has taken and identify which icons have executed.

DETAILED DESCRIPTION OF THE PREFERRED EMBODIMENT

Figure 1:
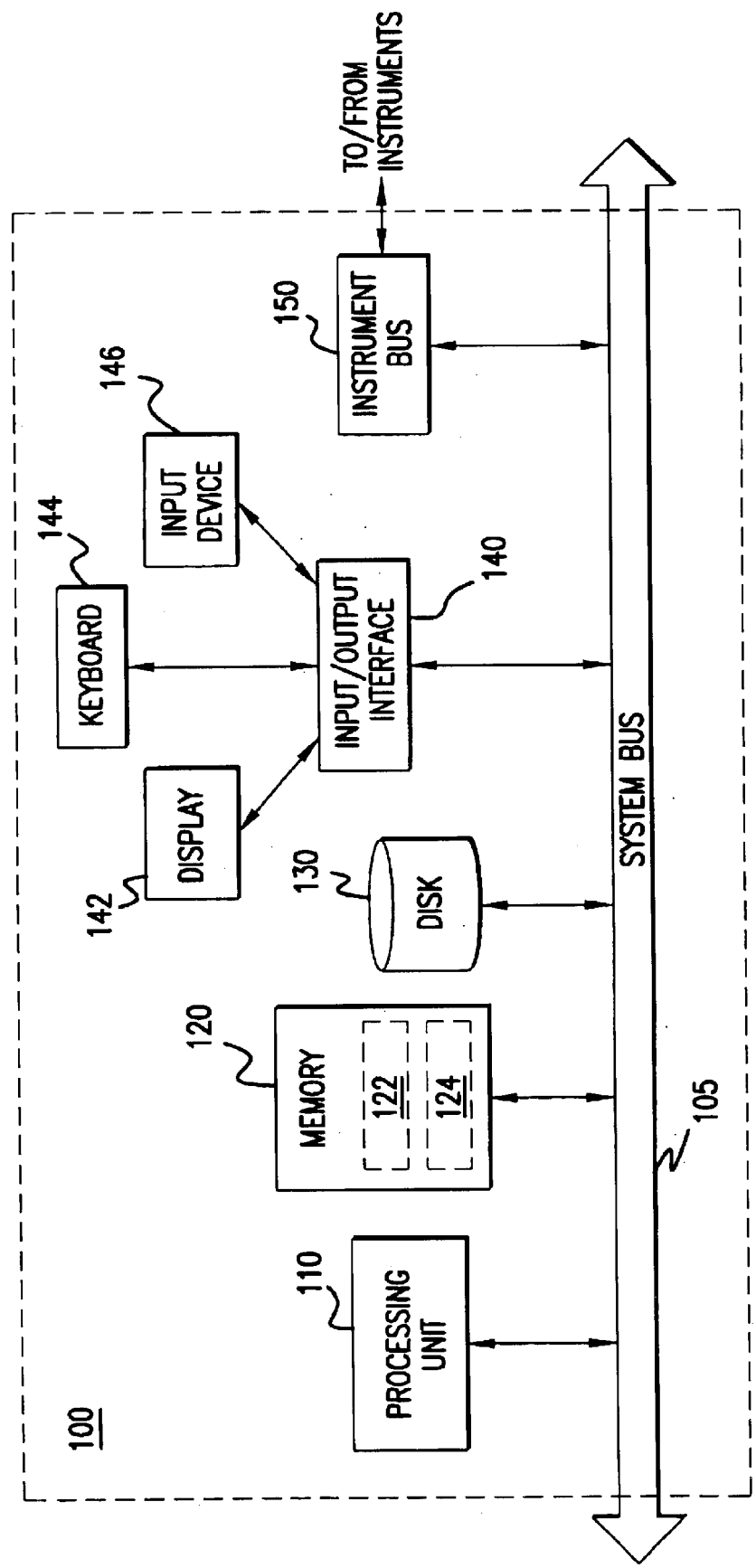
FIG. 1 shows a block diagram of a computer system incorporating the present invention.

FIG. 1 shows a block diagram of a computer system 100 incorporating the present invention. A processing unit 110 is connected to system bus 105. The system bus 105 facilitates communications between the processing unit 110 and memory 120, a data storage disk 130 and an input/output interface device 140. The memory stores the software of the present invention as well as all data collected and generated by the present invention. An first area 122 within the memory 120 is set aside for storage of the present method which is described more fully below. A second area 124 within the memory 120 contains the user-defined iconic network. The input/output interface device 140 controls data communications between the bus 105 and a display 142, a keyboard 144 and a point-and-click input device 146. An instrument bus 150 is used to allow the iconic programming system to communicate with test instruments. In a preferred embodiment, the instrument bus 150 is an IEEE-488 bus.

Figure 2:
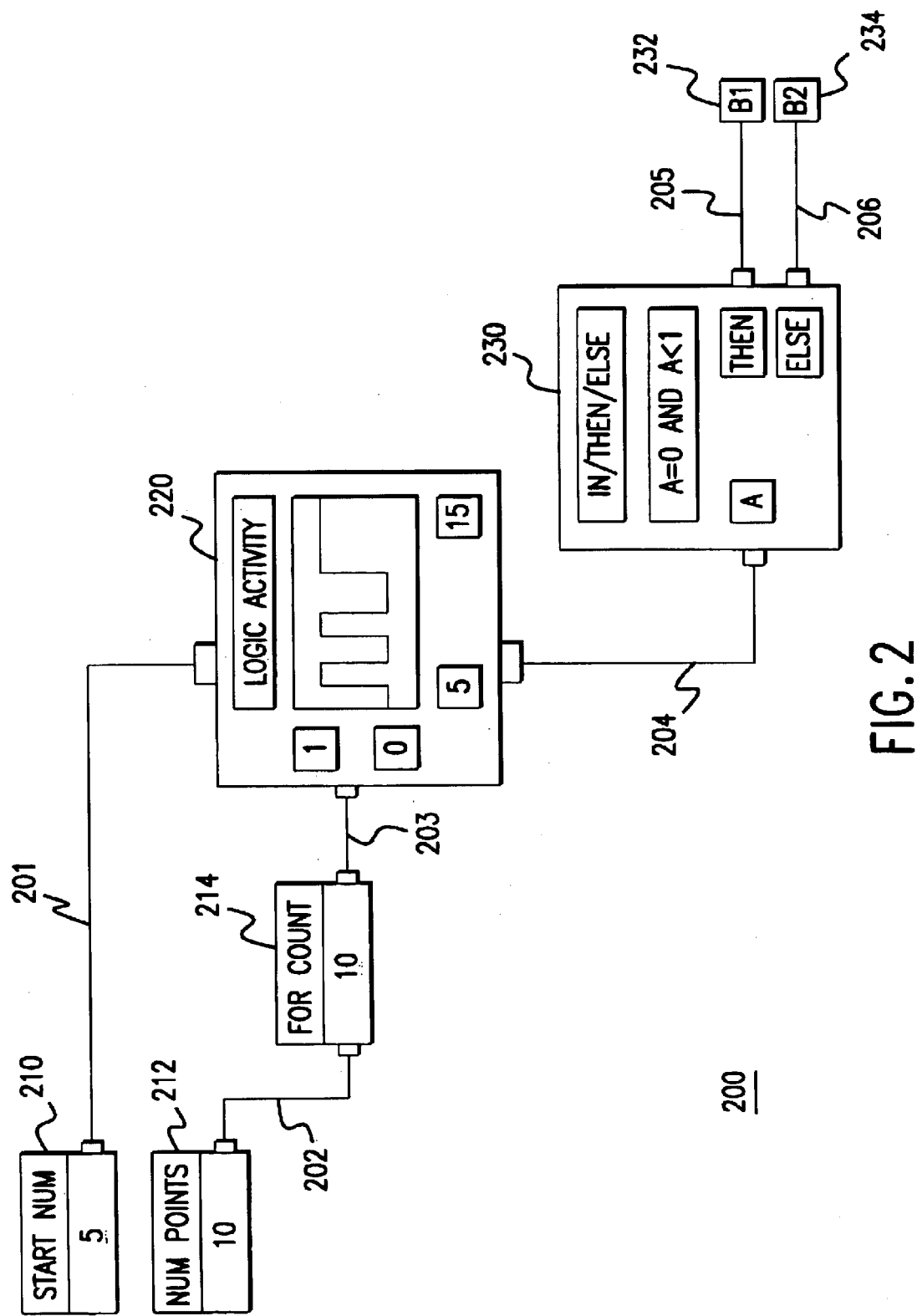
FIG. 2 shows a representative iconic network.

FIG. 2 shows a representative iconic network. Display screen 200 contains a first numeric input icon 210 which is used to define a start point and a second numeric input icon 212 which is used to define the number of points to be displayed in a view screen 220. The start point is sent over connecting line 201 to view screen 220 to set the starting point of the view screen which displays logic activity of a device under test (not shown), or DUT. The number of points to be displayed are sent over connecting line 202 to a count icon 214. The count icon 214 will count from zero to the number of points defined in icon 212. Each time the count icon 214 increments the count value by one, a signal will be sent over connecting line 203 to the view screen 220 which in turn updates the logic activity signal with an additional data point.

Each time the view screen 220 updates, a signal is sent over connecting line 204 to IF-THEN-ELSE function icon 230. If A is either equal to zero or less than 1, then function icon B1 is executed; else, if A equals 1, then function icon B2 is executed.

Each icon in FIG. 2 has a frame that is highlightable; that is, the lines that comprise the rectangular box that frames each icon can be set to be a predetermined color which in effect highlights the icon on the display screen.

Figure 3:
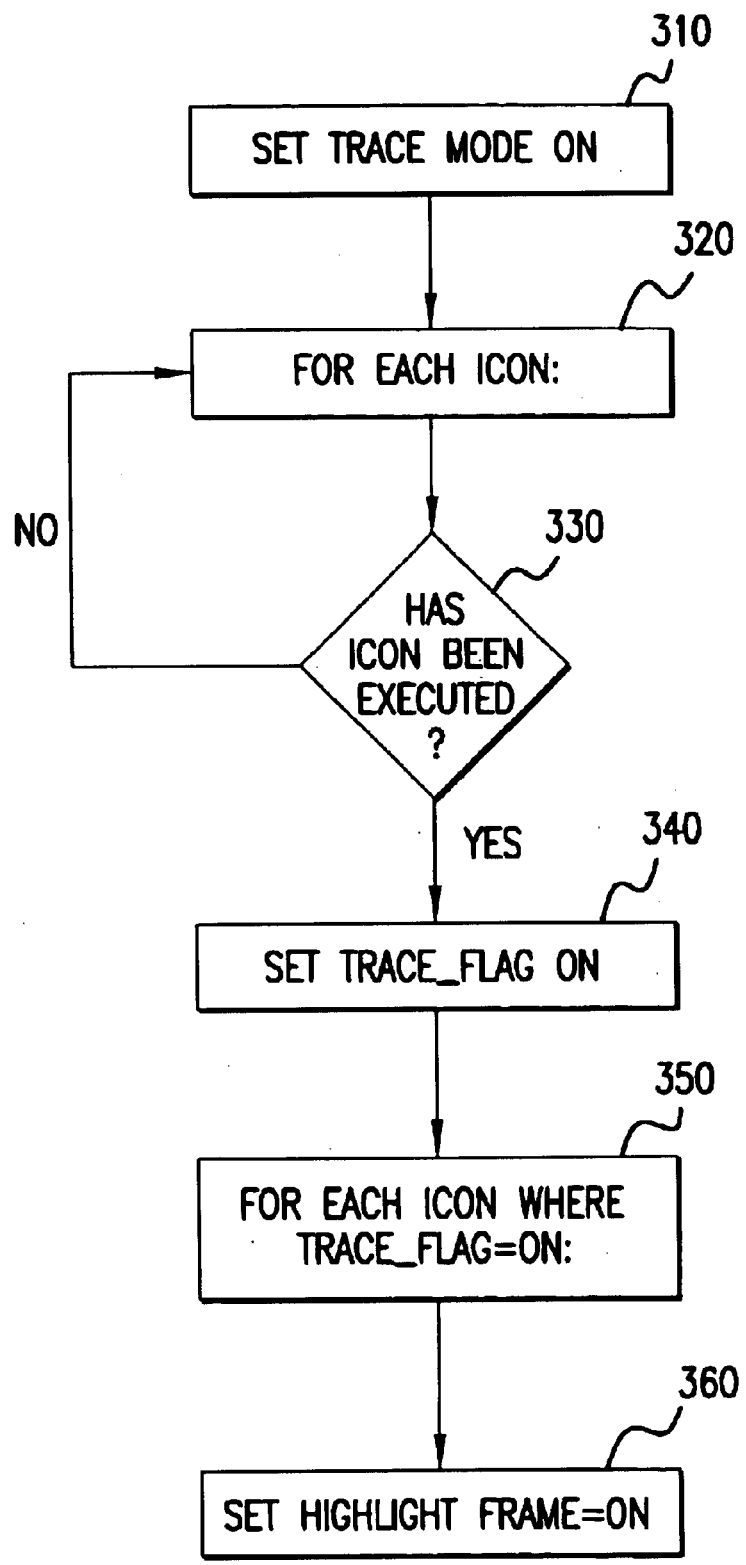
FIG. 3 shows a flowchart of the method for showing the execution trail of icons according to the present invention.

FIG. 3 shows a flow diagram of the present invention. Block 310 sets the trace mode of the present method to "on." In a preferred embodiment, this is accomplished by the end user who would click the mouse on a toolbar button to enable the present method. The "for loop" indicated by block 320 then operates to examine each icon in the display screen to determine if the icon was executed (decisional block 330). If the icon has not been executed, no action is taken. If decisional block 330 determines that the icon has been executed, control is passed to block 340 to set a TRACE_FLAG to "on."

After each icon is processed, block 350 examines each icon that has had its TRACE_FLAG set to on; for those icons that have TRACE_FLAG set equal to on, block 360 highlights the frame.

Referring back to FIG. 2 for illustrative purposes, as flow moves through each icon, the TRACE_FLAG for each icon that is executed is set equal to "on." For looping functions (e.g., icons 214 and 230), the present method will set highlight the last iteration of the of the loop. So, for example, if the "else" clause of the IF-THEN-ELSE function icon 230 executed during the last iteration of the loop, then function B2 234 will be highlighted, and not function B1 232.

While the present invention has been illustrated and described in connection with the preferred embodiments, it is not to be limited to the particular structures shown. It should be understood by those skilled in the art that various changes and modifications may be made within the purview of the appended claims without departing from the true scope and spirit of the invention in its broader aspects.

What is claimed is:

1. In an iconic programming system, wherein the iconic programming system contains an existing network of connected icons, a computer-implemented method for tracing the execution of icons, the method comprising the steps of:

executing a plurality of the icons via a run of a software program;

setting a flag for each icon executed in the executing step, the flag corresponding with the each icon; and simultaneously highlighting each icon corresponding with each flag set in the setting step subsequent to the run of the software program.

2. The method of claim 1, further comprising the step of performing the setting step during the executing step.

3. In an iconic programming system, wherein the iconic programming system contains an existing network of connected icons, a computer-implemented method for tracing the execution of icons, the method comprising the steps of:

executing a plurality of the icons;

setting a flag for each icon executed in the executing step, the flag corresponding with the each icon;

receiving an input subsequent to the executing step; and simultaneously highlighting, in response to the receiving step, each icon corresponding with each flag set in the setting step.

4. In an iconic programming system, wherein the iconic programming system contains an existing network of connected icons, a computer-implemented method for tracing the execution of icons, the method comprising the steps of:

executing a plurality of the icons;

indicating which of the icons are executed in the executing step;

determining, subsequent to the executing step and based on the indicating step, that the plurality of icons have been executed; and highlighting the plurality of executed icons in response to the determining step.

5. The method of claim 4, wherein the indicating step includes the step of setting, during the executing step, a plurality of flags respectively corresponding with the plurality of icons.

6. The method of claim 4, further comprising the steps of:

receiving an input subsequent to the executing step; and performing the determining step in response to the receiving step.

7. An iconic programming computer system containing an existing network of connected icons, the system comprising:

a display device; and logic configured to execute a plurality of the icons being displayed on the display device during a run of a software program and provide an indication as to which of the icons are executed during the run, the logic further configured to make a determination, subsequent to the run and based on the indication, that the plurality of icons have been executed and highlight the plurality of executed icons on the display device in response to the determination.

8. The system of claim 7, wherein the logic is further configured to set, during the run, a plurality of flags respectively corresponding with the plurality of icons, and wherein the indication is based on the flags.

9. The system of claim 7, wherein the logic is further configured to receive an input subsequent to the run and perform the determination in response to the input.

10. The system of 9, wherein the input is a user input.

* * * * *